United States Patent [19]

Papst et al.

[11] 4,374,585
[45] Feb. 22, 1983

[54] APPARATUS FOR THE DIRECT REDUCTION OF IRON ORES

[75] Inventors: Gero Papst, Buxtehude; Günther Röpke, Hamburg; Hans J. Töpfer, Gifhorn, all of Fed. Rep. of Germany

[73] Assignee: Hamburger Stahlwerke GmbH, Fed. Rep. of Germany

[21] Appl. No.: 176,894

[22] Filed: Aug. 11, 1980

Related U.S. Application Data

[62] Division of Ser. No. 18,977, Mar. 9, 1979, Pat. No. 4,248,623.

[30] Foreign Application Priority Data

Mar. 11, 1978 [DE] Fed. Rep. of Germany ....... 2810657
Mar. 11, 1978 [DE] Fed. Rep. of Germany ....... 2810701

[51] Int. Cl.$^3$ .............................................. F27B 1/16
[52] U.S. Cl. ..................................... 266/81; 266/156; 266/157; 266/187; 266/266; 266/47
[58] Field of Search ................. 266/47, 156, 172, 157, 266/186, 81, 187, 266; 75/34, 35, 91

[56] References Cited

U.S. PATENT DOCUMENTS

| 2,591,789 | 4/1952 | De Jahn | 75/34 |
| 3,877,868 | 4/1975 | Wenzel et al. | 75/91 |
| 4,046,557 | 9/1977 | Beggs | 75/34 |
| 4,118,017 | 10/1978 | Hendrickson | 266/187 |

Primary Examiner—M. J. Andrews
Attorney, Agent, or Firm—Ralph H. Dougherty

[57] ABSTRACT

A process for the direct reduction of iron ore in a shaft furnace having an upper reducing zone and a lower cooling zone in which reducing gas is introduced to the furnace at the bottom of the reducing zone around the periphery of the furnace, exhausted reducing gas or top gas is removed from the top of the furnace, cleaned, mixed with additional hydrocarbons, and reinjected into the furnace below the reducing zone. The hot reducing gas is injected serially into different sectors of the cross-section of the furnace and at varying velocities to force upflowing cleaned top gas to change its flow path or its flow rate, or both, periodically. Apparatus for accomplishing the method is also disclosed.

9 Claims, 8 Drawing Figures

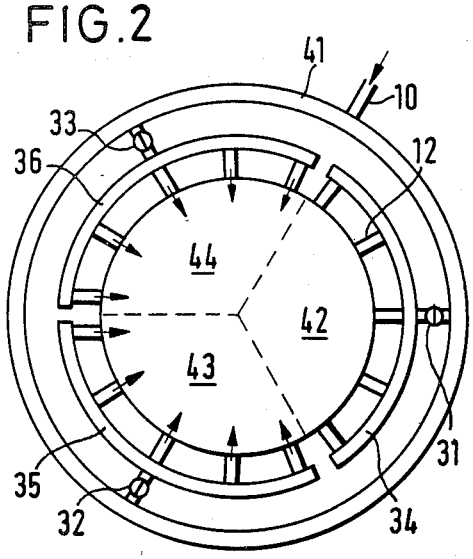
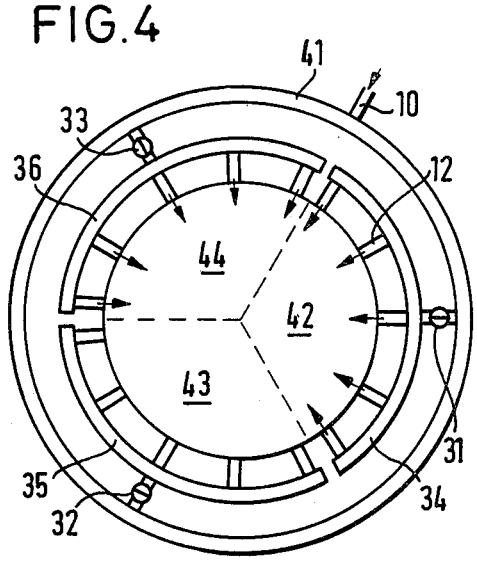
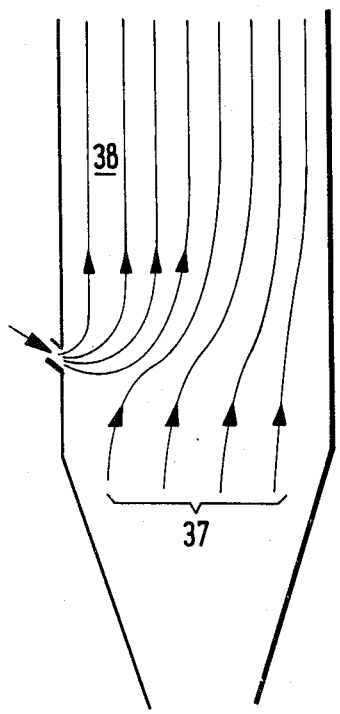
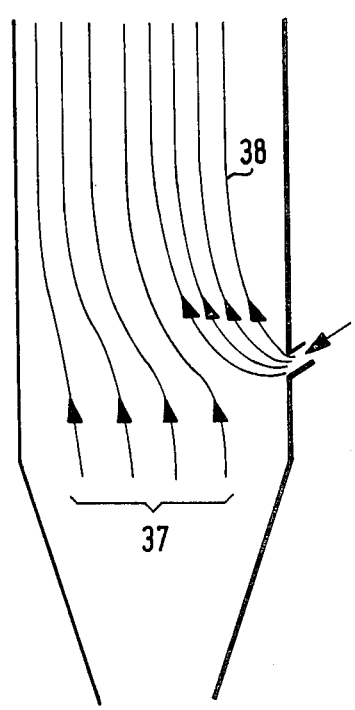

APPARATUS FOR THE DIRECT REDUCTION OF IRON ORES

This is a division of application Ser. No. 018,977, filed Mar. 9, 1979, now U.S. Pat. No. 4,248,623.

BACKGROUND OF THE INVENTION

This invention relates to a process and apparatus for the direct reduction of iron ores in a reduction furnace charged from above, such as a shaft furnace, wherein hot reducing gas is blown into a reduction zone in the furnace containing a packed bed burden of ore and waste gas or exhausted top gas is removed from the furnace above the reduction zone. Such a process is known from German published patent application No. 17 83 180 in which exhausted reducing gas is withdrawn from the reducing zone, passed through a gas scrubbing operation and a water removal operation, enriched with methane and reintroduced into the lowest section of the shaft furnace, which is a cooling zone, in which it comes into contact with hot reduced pellets. The gases move in counter-flow relationship with the downwardly flowing hot pellets, cooling the pellets and heating the gases which rise upwardly into the reduction zone. The hot pellets act as catalysts, thus when the waste gases, or top gases, enter the reduction zone carbon dioxide and methane are converted to carbon monoxide and hydrogen in accordance with the following gas reforming reaction:

$$CO_2 + CH_4 \rightarrow 2CO + 2H_2$$

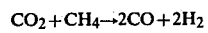

The reducing gas so formed operates as a reductant for the direct reduction of the iron oxide burden in the reducing zone. The reference also teaches that part of the cooled waste gas may be removed before the methane enrichment procedure and introduced into a middle region of the shaft furnace for temperature control purposes.

U.S. Pat. No. 4,046,557 discloses a shaft furnace direct reduction process, wherein a part of the cooling gas within the furnace flows upwardly from the cooling zone into the reduction zone. Top gas and natural gas can be added to the prepared cooling gas, the gas being reformed to reducing gas in the shaft furnace, in accordance with the following reactions:

$$CH_4 + CO_2 \rightarrow 2CO + 2H_2$$

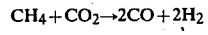

$$CH_4 + H_2O \rightarrow 3H_2 + CO$$

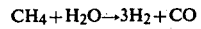

A reduction shaft furnace is usually fed with hot reduction gas from the periphery. When natural gas or spent top gas in injected below the hot reduction gas injection plane, for example into the cooling zone, the upwardly rising gas is forced inwardly to the center of the shaft. When large quantities of cooling gas flow upwardly through the center of the shaft furnace, the burden becomes excessively cooled which slows the ore reduction process. Metallization of the sponge iron produced is impaired. The amount of cracking gas which can be produced by the reaction of methane on the hot sponge iron is also reduced.

The invented process will prevent excess localized cooling within the reduction zone, provide a high degree of iron ore metallization and provide generally uniform reduction of the burden throughout its entire cross-section. When natural gas is introduced to the furnace below the reducing zone, either in concentrated form or mixed with cleaned spent top gas, the heat content of the reduced sponge iron burden is more effectively utilized for in situ reforming of the natural gas to reducing gas than it is in the previously known processes.

OBJECTS OF THE INVENTION

It is the principal object of this invention to provide a process and apparatus for direct reduction of iron ore which will prevent excessive localized cooling of the burden in a shaft furnace reducing zone.

It is also an object of this invention to provide a process for the direct reduction of iron ore having a high degree of iron ore reduction.

It is another object of this invention to provide a process for reducing an iron ore burden in a shaft furnace uniformly throughout the entire cross-section of the burden.

It is still another object of this invention to provide a process for better utilizing the heat content of the reduced sponge iron burden to reform spent top gas and/or methane introduced beneath the reducing zone than was heretofore possible.

SUMMARY OF THE INVENTION

The objects of this invention are achieved by introducing spent top gas, methane, or a combination thereof into a shaft furnace beneath the reducing zone, allowing such gas to rise upwardly through the burden into the reducing zone while being thermally reformed into a reducing gas mixture, then selectively displacing this reformed reducing gas mixture into different regions of the cross-section of the reducing zone by controlling the flow of hot reducing gas through the reducing gas inlets to vary its velocity and direction of flow through the burden.

BRIEF DESCRIPTION OF THE DRAWINGS

This invention is better understood by reference to the following detailed description and the appended drawings in which:

FIG. 2 is a diagrammatic cross-section of the shaft furnace of FIG. 1 taken through the hot gas bustle section.

FIG. 3 is a diagram of gas flows through the furnace of FIG. 1 when the furnace is operated according to the settings depicted in FIG. 2.

FIG. 4 is a cross-sectional view of the furnace taken through the bustle in the same manner as FIG. 2 but with different valve settings.

FIG. 5 is a gas flow diagram similar to that of FIG. 3 showing the gas flows when the valves are set as depicted in FIG. 4.

DETAILED DESCRIPTION

Figure 1:
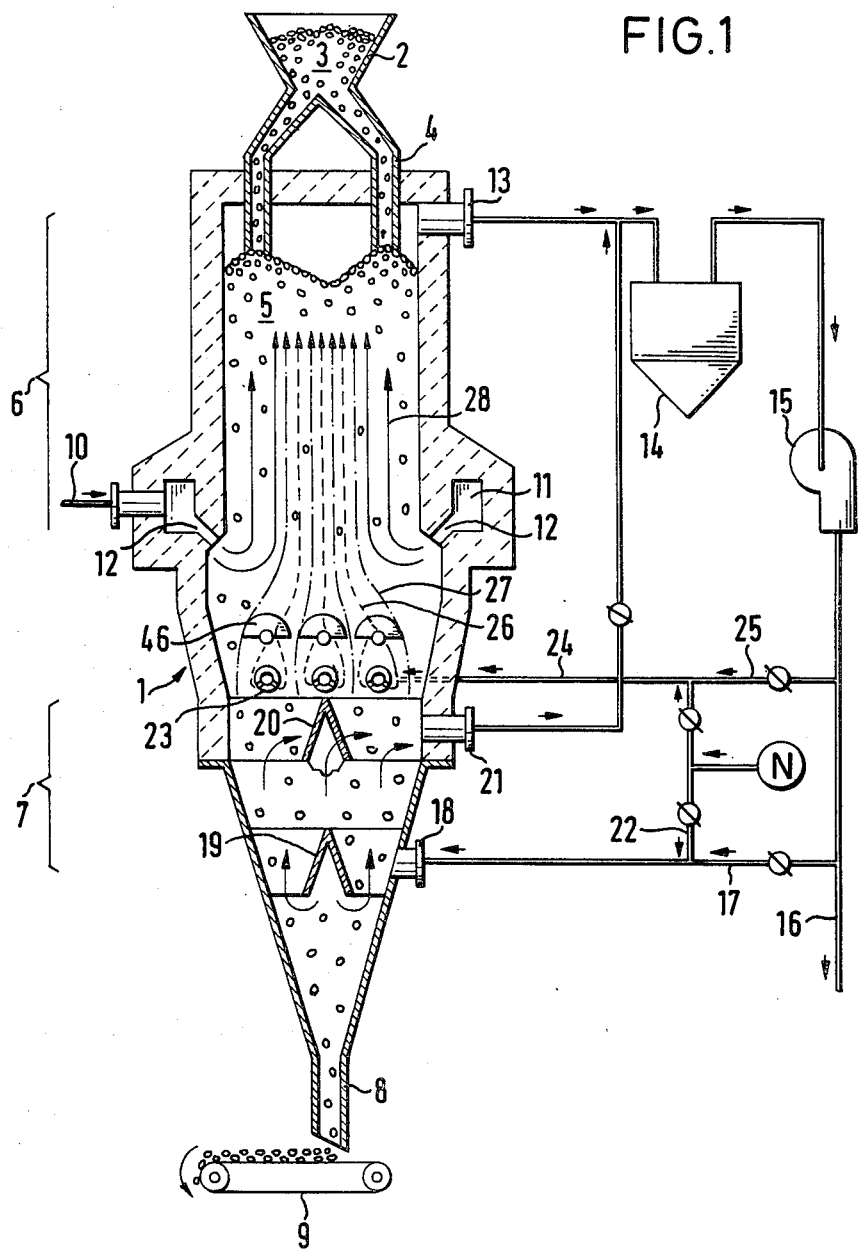
FIG. 1 is a schematic vertical section of a shaft furnace and related equipment in accordance with the present invention.

Referring now to FIG. 1, a shaft furnace 1 has a charging hopper 2 for charging iron oxide pellets 3 or other material such as lump ore through feed tubes 4 into the interior of furnace 1 to form a burden 5 of particulate iron oxide bearing material therein. The shaft furnace has an upper reduction zone 6 and a lower cooling zone 7. A pellet discharge pipe 8 is provided at the bottom of the shaft furnace. Cooled metallized pellets are removed by conveyor 9 to establish a gravitational flow of the pellet burden downwardly through the furnace. Reducing gas, which has been produced from gaseous hydrocarbons and cleaned spent top gas in a conventional gas reformer (not shown), is introduced through gas supply pipe 10 to a bustle system 11 having a plurality of downwardly inclined gas passages 12 through which the gas enters the furnace to flow upwardly in counter-flow relation with the downwardly descending burden. The reacted reducing gas is removed from the furnace at gas outlet 13 in the form of top gas, then conducted to a gas washer 14 wherein it is cleaned. Blower 15 conducts the cleaned top gas through conduit 16 to a reformer for production of reducing gas. In the preferred embodiment shown in FIG. 1, top gas in part is conducted through conduit 17 and cooling gas inlet 18 to gas distributor member 19 at the lower end of the cooling zone 7 within the furnace. At the upper end of the cooling zone, a portion of the cooling gas is collected by cooling gas collecting member 20 and removed from the furnace by way of cooling gas outlet 21 from whence it is recycled to gas washer 14. A source of natural gas N is connected to conduit 17 by conduit 22 whereby natural gas can be added to the recycled cooling gas and top gas mixture.

Below the plane of bustle 11 in which the hot reduction gas is injected into the furnace, natural gas mixed with top gas is introduced into the reduction furnace. This can be effected by horizontal gas distributor pipes 23 incorporated into the furnace or alternatively by a second set of peripheral injection nozzles in a lower plane having its own bustle gas conduit.

In a preferred embodiment of the invention shown in FIG. 1 natural gas is supplied to gas distributor pipes 23 by a conduit 24 below the reduction zone. Disposed above the gas distributor pipes 23 are cluster breakers 46. Top gas supplied by conduit 25 may be mixed with the natural gas from natural gas supply N.

The natural gas or natural gas top gas mixture issuing from the gas distributor pipes 23 rises through the burden substantially in the manner indicated by broken lines 26 and initially reacts in concentrated form on the sponge iron. As it rises into the hotter regions of the furnace, it is gradually mixed with the cooling gas which rises from the lower portion of the furnace and is indicated by dash-dotted lines 27. Thus, as the upwardly flowing gas meets higher temperature sponge iron, a natural gas which is increasingly strongly mixed with top gas is available so that the supply of $CO_2$ and $H_2O$ required for cracking the natural gas continuously increases. Cracking of the natural gas is also effected to a lesser extent by reaction with $H_2O$ and $CO_2$ formed in the ore reduction step.

This mode of operation is based on the recognition that, at low temperatures, a gas mixture with a high proportion of natural gas must be supplied to the sponge iron. In this way it is possible to achieve natural gas cracking on the sponge iron down to temperatures of about 450° C., thus providing very economical utilization of the heat content of the sponge iron. In contrast, as temperatures rise, a higher proportion of top gas in the natural gas top gas mixture is desirable.

The gas mixture which flows upwardly into the reduction zone 6 has a tendency to be forced toward the center of the shaft furnace by the reduction gas injected from the periphery, as shown by solid lines 28. This occurs not only when a cooling zone 7 is employed in the reduction furnace, as shown in FIG. 1, but whenever a cold or pre-heated hydrocarbon-top gas mixture is introduced into the shaft furnace below the plane in which the hot reduction gas is injected. This causes the central part of the burden to be cooled more than the average, and this not only restricts the amount of crackable natural gas, but also reduces the iron ore in a non-uniform manner over the cross-section of the shaft furnace.

This invention prevents non-uniform reduction of the burden by successively displacing the upwardly flowing hydrocarbon-top gas mixture into different regions of the cross-section of the reduction zone, by a hot reduction gas flow which varies periodically in direction and/or a reduction gas flow which varies periodically in flow rate or velocity.

FIGS. 2 to 5 diagrammatically show how the problem of preventing excessive cooling in a region of the cross-section of the reduction zone is solved by shutting off the gas flow to the gas passages 12 in segments. For example, the bustle 11 may consist of three (or more) sector-shaped segments 34, 35 and 36 which are not joined together and which can be shut off by respective hot gas slide valves 31, 32 and 33 from the annular supply conduit 41 supplying hot reduction gas, or to which segments 34, 35 and 36 the supply of gas can be throttled by means of the slide valves. The gas supply conduit 41 is connected to the hot reducing gas supply pipe 10. The cross-section of the shaft may be imagined as being divided into sectors 42, 43 and 44 which are respectively associated with the sector-shaped bustle segments 34, 35 and 36. If, as shown in FIG. 2, the supply of gas to segment 34 of the bustle is shut off by closing slide valve 31, then the reducing gas can only enter the reduction zone through the gas passages 12 of segments 35 and 36, so that the gas is injected in a radially asymmetric flow which results in the flow pattern shown in FIG. 3. The upwardly moving gas flows denoted by flow lines 37 are predominantly displaced into sector 42 of the cross-section of the reduction zone by the reducing gas 38 which is injected at one side of the furnace. This causes this part of the furnace cross-section to be cooled down in the lower regions as heat is taken from the hot sponge iron to heat the gas rising out of the cooling zone to carry out the following reactions:

$$CH_4 + CO_2 \rightleftharpoons 2CO + 2H_2$$

$$CH_4 + H_2O \rightleftharpoons CO + 3H_2$$

$$CH_4 \rightleftharpoons C + 2H_2$$

After a certain period of time, the apparatus must be switched over so that the cooled portion of the cross-section of the burden is again heated by the reduction gas, while another portion of the cross-section of the burden is cooled. This is effected in the manner shown in FIGS. 4 and 5 by shutting off the segment 35 by closing hot gas slide valve 32. In this case the slide valve 32 closes while the slide valves 31 and 33 are open. The sponge iron burden acts as a heat exchanger. The downwardly moving burden is used in sectors as a regenerator, with the upwardly flowing hot reducing gas serving as a heating medium, the downwardly moving burden material storing the heat and then yielding it to the natural gas-top gas mixture, as sensible heat for heating the gas mixture and as reaction heat for the natural gas cracking reaction.

If the hot gas slide valves 31 to 33 are successively opened and closed at the correct speed, the flow rate of the gases in the furnace is not changed. The temperature field pattern in the furnace has a slow rotary movement as the particles of the burden are alternately subjected to the hot gas, then for a given period of time to the cold gas which rises out of the lower part of the furnace, then again to the hot reduction gas. This provides a degree of iron ore reduction which is virtually uniform over the entire burden in the furnace. Alternatively, instead of fully shutting off one of the hot gas slide valves, the gas flow may be reduced to a segment by only throttling its respective hot gas slide valve.

Figure 6:
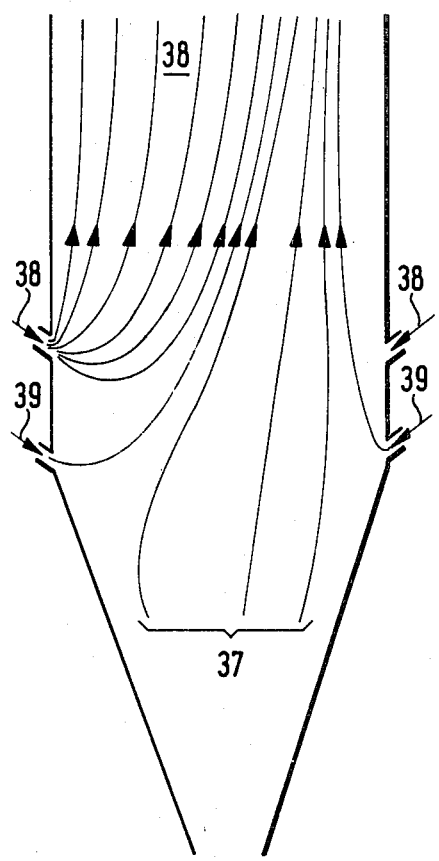
FIGS. 6 and 7 are gas flow diagrams showing alternative means of operating the furnace.
Figure 7:
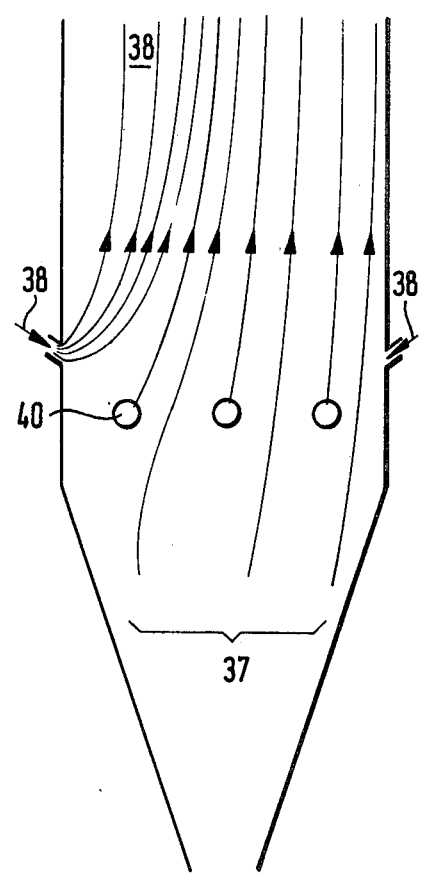

FIGS. 6 and 7 are diagrammatic views showing two further possible ways of successively displacing the rising cooling gas flow into different regions of the cross-section of the reduction zone, by means of a hot reducing gas flow which varies periodically in direction and/or a reducing gas flow which varies periodically in strength, velocity, or flow rate when the hydrocarbon-top gas mixture is injected either through horizontal pipes or through a second ring of nozzles below the plane in which the hot reducing gas is injected. In the drawings, reference numeral 37 denotes the gas flows which rise out of the cooling zone, reference numeral 38 denotes the reducing gas which is injected from the periphery, reference numeral 39 denotes a natural gas or natural gas-top gas mixture which is injected from the periphery, and reference numeral 40 denotes pipes corresponding to the pipes 23 in FIG. 1, through which natural gas or a natural gas-top gas mixture is injected. FIGS. 6 and 7 show a condition corresponding to that shown in FIG. 3. After a predetermined period of time, the hot reducing gas flow, and, insofar as concerns the apparatus shown in FIG. 6, also the natural gas flow, is injected from a different direction so that the rising gas flow is displaced into a different segment of the cross-section of the reduction zone.

As a specific example of the operation of this invention, iron ore is reduced in a shaft furnace at a temperature of 850° C. by reaction with a mixture of hydrogen and carbon monoxide, which for the major part is produced by cracking methane with the carbon dioxide of recycled top gas. About 1700 Nm$^3$ of reduction gas is required per ton of reduced sponge iron. The natural gas consumption is 3.1 Gcal $H_u$/per t ($H_u$=lower calorific heating value) of sponge iron. Nonety-one percent (91%) of the iron is present in the sponge iron as metal, with 9% in the form of oxide.

When natural gas is injected as shown in FIG. 7, about 300 Nm$^3$ of reduction gas and about 12 kg of carbon are additionally produced per ton of sponge iron of normal production, which quantities are sufficient for the production of an additional amount of about 180 kg of sponge iron and an increase of about 1% in the carbon content. For this purpose, about 64 Nm$^3$ of natural gas must be injected below the shaft furnace reduction zone, and about 32 Nm$^3$ of top gas must flow upwardly into the reduction zone.

Figure 8:
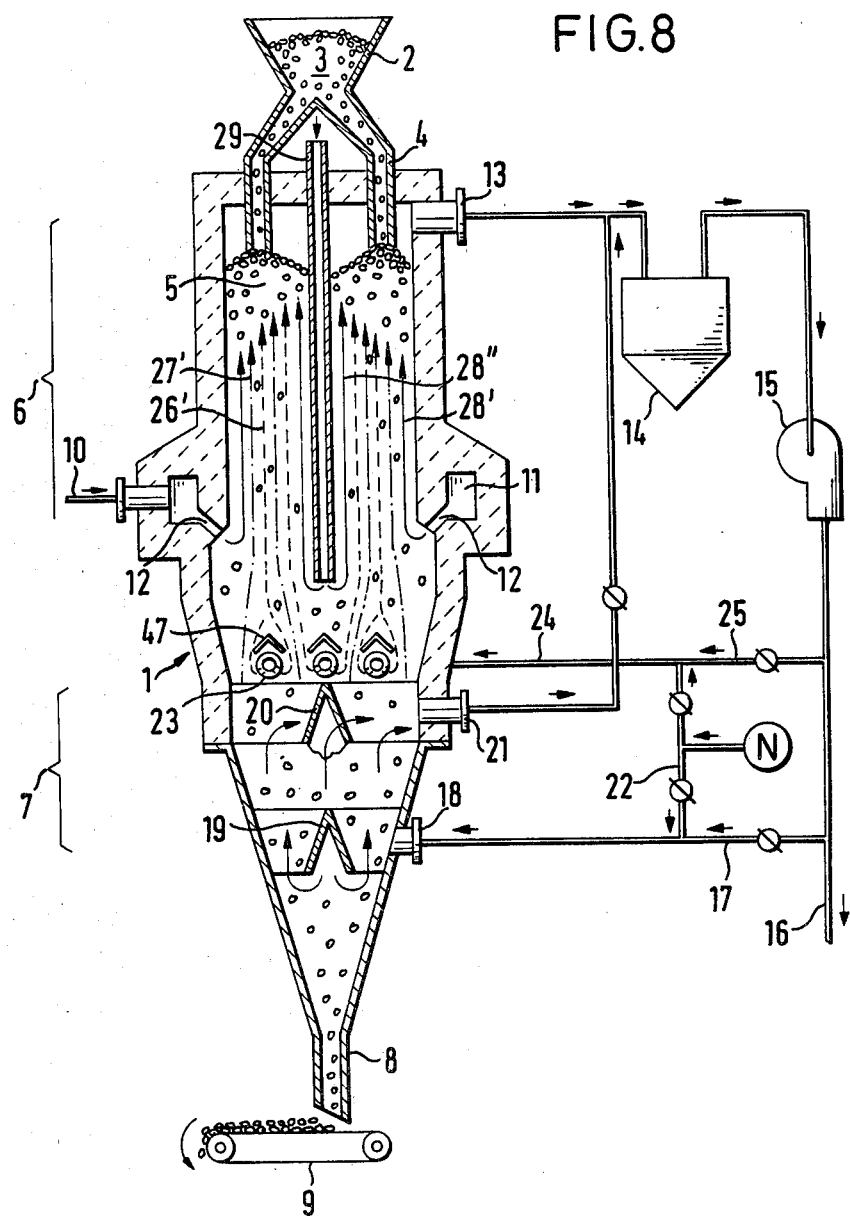
FIG. 8 is a schematic vertical section of a shaft furnace and related equipment for carrying out an alternative process in accordance with the invention.

In another embodiment of the invention, as shown in FIG. 8, instead of injecting all of the reduction gas from the periphery of the shaft furnace, some gas is injected through a pipe 29 which is disposed axially in the shaft furnace and which is arranged centrally, or a plurality of pipes, with a fluctuating flow velocity, that is, in a pulsating manner, the discharge opening of the pipe or pipes 29 being disposed above the horizontal gas distributor pipes 23, at about the lower end of the reduction zone 6. During the operation of injecting reduction gas through pipe 29, the flow conditions shown by lines 26', 27', 28' and 28" are produced. The middle zone is kept at the required temperature by the axially supplied reduction gas 28". The gas distributor pipes 23 are protected against the downwardly moving burden in the furnace by protective cover members 47 above the pipes. As already mentioned, more economical utilization of the heat content of the sponge iron is possible if the ratio of the hydrocarbon-top gas mixture is adapted according to the temperature of the sponge iron in the respective zone. The manner in which such adaptation is to be effected will be seen from the test results set out in Table 1.

A number of tests were carried out in order to study the influence of temperature and ratio of top gas to natural gas in the cracking of natural gas in the presence of sponge iron pellets. In each of the tests, the intake composition of the gas mixture introduced into the sponge iron pellets and the outlet composition of the gas mixture leaving the pellets, were determined.

TABLE

Results from the tests of natural gas cracking in sponge iron

| Temp. | Top gas/ natural gas Ratio | Moisture content | Intake Compositions - % | | | | Outlet Compositions - % | | | |
| --- | --- | --- | --- | --- | --- | --- | --- | --- | --- | --- |
| | | | CH$_4$ | CO | CO$_2$ | H$_2$ | CH$_4$ | CO | CO$_2$ | H$_2$ |
| 900° C. | 0/100 | 19.4% | 82.8 | 0 | 1.1 | 0 | 3.5 | 9.95 | 0 | 80.7 |
| 820° C. | 0/100 | 19.4% | * | * | * | * | 13–16 | 9.5 | 0.05 | 69–66.5 |
| 750° C. | 0/100 | 19.4% | * | * | * | * | 36 | 8.4 | 0.6 | 47.5 |
| 900° C. | 0/100 | 18.5% | * | * | * | * | 4.2 | 6.5 | 0 | 82.3 |
| 480° C. | 0/100 | 17.7% | 82.3 | 0 | 1.0 | 0 | 79.4 | 0.4 | 1.0 | 3.8 |
| 550° C. | 0/100 | 17.7% | 82.4 | 0 | 1.0 | 0 | 76.5 | 1.6 | 1.1 | 4.4 |
| 630° C. | 0/100 | 17.7% | 82.4 | 0 | 1.0 | 0 | 74 | 3.77 | 0.95 | 8.3 |
| 690° C. | 0/100 | 17.7% | 81.5 | 0 | 1.0 | 0 | 71 | 2.1 | 0.9 | 9.0 |
| 750° C. | 0/100 | 17.7% | 83.8 | 0 | 1.3 | 0 | 62 | 5.0 | 0.7 | 16.4 |
| 710° C. | 0/100 | 17.7% | 81.5 | 0 | 1.0 | 0 | 71 | 2.4 | 0.8 | 10.9 |
| 700° C. | 0/100 | 17.7% | 81.5 | 0 | * | 0 | 75 | 0.6 | | |
| 700°6.5 | | | | | | | | | | |
| 700° C. | 50/50 | None | 52 | 9.7 | 6.0 | 17.8 | 50.7 | 12.0 | 4.7 | 18.0 |
| 710° C. | 1/2 | None | 60 | 7 | 5 | 12 | 50 | 14 | 1 | 20 |
| 660° C. | 1/2 | None | 60 | 5 | 4.6 | 10 | 57 | 10 | 3.4 | 14 |
| 610° C. | 1/3 | None | 72 | 2.5 | 2.6 | 5.3 | 70 | 4.2 | 1.9 | 6.5 |
| 550° C. | 1/2 | None | 62.5 | 7.0 | 4.8 | 12.3 | 63.5 | 5.7 | 4.9 | 11.3 |
| 500° C. | 1/2 | None | 60.4 | 7.2 | 4.6 | 13.1 | 61.9 | 5.2 | 5.2 | 12.9 |
| 605° C. | 1/2 | None | 60 | 7 | 4.7 | 12.5 | 62 | 7.3 | 4.3 | 11.7 |

TABLE-continued
Results from the tests of natural gas cracking in sponge iron

| Temp. | Top gas/ natural gas Ratio | Moisture content | Intake Compositions - % | | | | Outlet Compositions - % | | | |
|---|---|---|---|---|---|---|---|---|---|---|
| | | | CH$_4$ | CO | CO$_2$ | H$_2$ | CH$_4$ | CO | CO$_2$ | H$_2$ |
| 600° C. | 0/100 | 17.7% | 83 | 0 | 1 | 0 | 76 | 0.4 | 0.5 | 7 |

*not determined

As can be seen from Table 1, a gas mixture with stoichiometric proportions of CH$_4$ and CO$_2$ is no longer reacted at sponge iron temperatures of 700° C. or lower. Therefore, if a waste gas or top gas enriched with methane is introduced into the lowermost cooling section of the shaft furnace, in accordance with the method disclosed in DAS No. 1 783 180, the methane cracking action can only occur above a temperature of 700° C., even if the waste gas is enriched with methane to the desired stoichiometric ratio, and the heat content of the sponge iron below 700° C. remains unused for the production of reduction gas.

As can be seen from Table 1, at a temperature of 660° C., reaction of the natural gas occurs if the gas mixture contains about two-thirds natural gas and one-third top gas. Below about 600° C., only the following reaction occurs:

$$CH_4 \rightarrow C + 2H_2$$

This reaction occurs above about 470° C. However, it is retarded by relatively small amounts of waste gas, because of the dilution effect and the reverse reaction caused by the hydrogen content of the waste gas, so that the reaction will take place only in pure or slightly diluted natural gas.

The waste gas produced in the direct reduction operation has a sample composition similar to:

| CO$_2$ | H$_2$O | H$_2$ | CO | N$_2$ | CH$_4$ |
|---|---|---|---|---|---|
| 17.8% | 7.0% | 42.8% | 19.1% | 10.1% | 3.3% |

Therefore, besides carbon dioxide and steam, the waste gas also includes a significant proportion of hydrogen and carbon monoxide. This is the reason why as the temperature falls, the sponge iron must be supplied with a gas mixture which has an increasing proportion of natural gas and a decreasing proportion of top gas. In order to be able to make use of the heat content of the sponge iron below a temperature of 600° C. for natural gas cracking, the natural gas must be in concentrated form, or only slightly mixed with waste gas, when it is injected into the reduction furnace cooling zone.

It is readily apparent from the above description that the present invention provides a process and apparatus which achieve the principal and ancillary objects set forth above. Other alternative embodiments are possible without departing from the spirit of the invention, and no limitations are to be inferred except as specifically set forth in the appended claims.

What is claimed is:

1. Apparatus for the direct reduction of iron ores characterized by:
   (a) a reduction shaft furnace (1) having an upper opening (2) for the introduction of iron ores (3) and a lower opening (8) for the discharge of sponge iron product;
   (b) a reduction zone (6) at whose lower end hot gas inlet passages (12) open in to the shaft furnace, which gas passages are arranged about the whole circumference of said furnace and are connected to a gas feed line (10) for hot reduction gas, and at whose upper end there is provided gas outlet (13) for waste gas;
   (c) a cooling zone (7) below the reduction zone, with a lower inlet (18) and an upper outlet (21) for the cooling gas;
   (d) a plurality of horizontally oriented gas distributor pipes (23) in said furnace beneath hot gas inlet (12) and above the cooling zone (7), said pipes (23) communicating with a source of hydrocarbon gas; and
   (e) a means (31 to 36) whereby the supply of hot reduction gas to the gas inlet passages (12) can be sector-wise interrupted or reduced.

2. Apparatus according to claim 1 characterized in that the gas passages (12) for the reduction gas are connected in groups to ring main conduit portions (34, 35, 36) which are separated from each other and in whose feed conduits there are provided separately controllable hot gas slide valves (31, 32, 33).

3. Apparatus for the direct reduction of iron ore comprising:
   (a) a shaft furnace having an upper inlet for receiving iron ore, a lower outlet for discharging sponge iron product, a hot reducing gas inlet intermediate the ends of the furnace, and a top gas outlet at the upper end of the furnace;
   (b) a hot gas distribution system communicating with said hot gas inlet, said system including a multiplicity of arcuate bustles, each connected to a plurality of adjacent gas passages and to a control valve in the gas inlet to each bustle, each bustle controlling hot gas flow to a sector-shaped area of the furnace; and
   (c) a lower cooling gas distributing member and an upper cooling gas collecting member within said furnace, a gas conduit connected to said collecting member for removing cooling gas, means connected to said conduit for cleaning and cooling said removed cooling gas and a second conduit between said cleaning means and said distributing member for reintroducing cooling gas to said furnace, means communicating with said top gas outlet for cleaning spent top gas, and conduit means communicating with said distributing member for injecting a portion of the cleaned top gas into the cooling zone.

4. Apparatus according to claim 3 further comprising a source of natural gas communicating with said second conduit.

5. Apparatus for the direct reduction of iron ore comprising:
   (a) a shaft furnace having an upper inlet for receiving iron ore, a lower outlet for discharging sponge iron product, a hot reducing gas inlet intermediate the ends of the furnace, and a top gas outlet at the upper end of the furnace;

(b) a hot gas distribution system communicating with said hot gas inlet, said system including a multiplicity of arcuate bustles, each connected to a plurality of adjacent gas passages, and to a control valve in the gas inlet to each bustle, each bustle controlling hot gas flow to a sector-shaped area of the furnace; and (c) a plurality of horizontally oriented gas distribution pipes in said furnace beneath said hot gas inlet, said pipes communicating with a source of hydrocarbon gas.

6. Apparatus according to claim 5 wherein said pipes also communicate with a source of top gas.

7. Apparatus according to claim 5 wherein said pipes are provided with gas discharge openings distributed over their entire lengths.

8. Apparatus according to claim 5 further comprising pipe cover members disposed in said furnace above said pipes.

9. Apparatus for the direct reduction of iron ore comprising:
(a) a shaft furnace having an upper inlet for receiving iron ore, a lower outlet for discharging sponge iron product, a hot reducing gas inlet intermediate the ends of the furnace, and a top gas outlet at the upper end of the furnace;

(b) a hot gas distribution system communicating with said hot gas inlet, said system including a multiplicity of arcuate bustles, each connected to a plurality of adjacent gas passages and to a control valve in the gas inlet to each bustle, each bustle controlling hot gas flow to a sector-shaped area of the furnace; and (c) a vertical hot reducing gas pipe generally axial of said furnace communicating with a source of hot reducing gas and terminating in said furnace near the bottom of the reduction zone.

* * * * *

UNITED STATES PATENT AND TRADEMARK OFFICE
CERTIFICATE OF CORRECTION

PATENT NO. : 4,374,585
DATED : February 22, 1983
INVENTOR(S) : Gero Papst, Gunther Ropke, Hans-Jorg Topfer It is certified that error appears in the above—identified patent and that said Letters Patent is hereby corrected as shown below:

Column 4, line 54, change "$CH_4 + H_2O + CO + 3H_2$" to $CH_4 + H_2O \rightleftharpoons CO + 3H_2$ Column 6, line 63, next to right hand column insert 0.6, last column insert 6.5.

Column 6, line 64, delete "700°6.5".

Signed and Sealed this

Seventh Day of June 1983

[SEAL]

Attest:

DONALD J. QUIGG

Attesting Officer

Acting Commissioner of Patents and Trademarks